No. 757,444. PATENTED APR. 19, 1904.
J. H. ENTREKIN.
AXLE.
APPLICATION FILED AUG. 14, 1903.
NO MODEL.

Witnesses
Inventor
J. H. Entrekin
by James J. Sheehy
Attorney

No. 757,444. Patented April 19, 1904.

UNITED STATES PATENT OFFICE.

JOSEPH H. ENTREKIN, OF CRAIG, NEBRASKA.

AXLE.

SPECIFICATION forming part of Letters Patent No. 757,444, dated April 19, 1904.

Application filed August 14, 1903. Serial No. 169,524. (No model.)

*To all whom it may concern:*

Be it known that I, JOSEPH H. ENTREKIN, a citizen of the United States, residing at Craig, in the county of Burt and State of Nebraska, have invented new and useful Improvements in Axles, of which the following is a specification.

My invention pertains to that class of axles which comprise removable spindles; and it consists in the novel and advantageous axle hereinafter described, and particularly pointed out in the claim appended.

Figure 1:
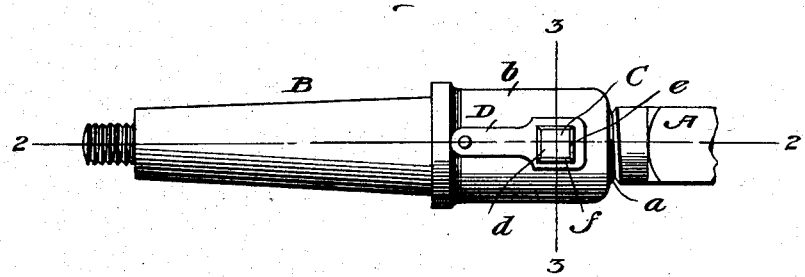
Figure 2:
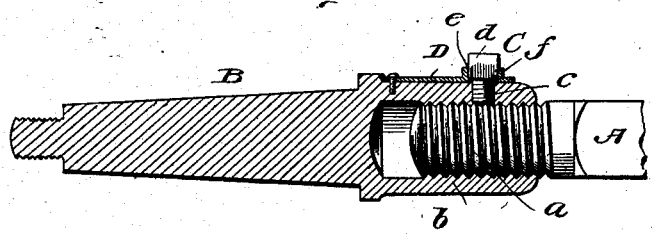
Figure 3:
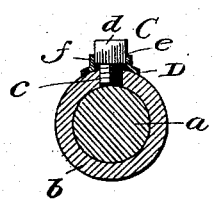

In the accompanying drawings, forming part of this specification, Figure 1 is a top plan view of one end portion of an axle constructed in accordance with my invention; Fig. 2, a longitudinal central section taken in the plane indicated by the line 2 2 of Fig. 1, and Fig. 3 a transverse section taken in the plane indicated by the line 3 3 of Fig. 1.

Both end portions of my improved axle embody the same construction, and I have therefore deemed it sufficient to illustrate one end portion.

Similar letters designate corresponding parts in all of the views of the drawings, referring to which—

A is an axletree, of steel or other suitable metal, having a circular and threaded end portion *a*.

B is a spindle having a threaded socket *b* in its inner end, designed to receive the threaded end portion *a* of the axletree, and C is a screw bearing in a threaded aperture *c* in the wall of socket *b* and adapted to be set against the end portion *a* of the axletree, with a view of securing the spindle thereon and holding said spindle against casual rotation and becoming loose.

In virtue of the axletree being provided with a circular and threaded end *a* and the spindle with a threaded socket *b* it will be observed that when the spindle is screwed up on the threaded end *a* and fixed thereon through the medium of the screw C the mouth of the socket will be tightly closed and grease and dirt effectually prevented from entering the said socket, where the former would be liable to cause the screw to work loose. It will also be observed that the provision of the circular end *a* on the axletree and the socket *b* in the spindle does not weaken the axle, since the circular end of the tree occupies and reinforces the wall of the socket *b* and is in turn reinforced and strengthened by said wall.

In order to effectually prevent the screw C from casually working loose when said screw is set against the threaded end *a* of the axletree, I make the head *d* of said screw angular, preferably rectangular, as shown, and provide the spring-fastener D, preferably of sheet metal. This fastener is pivotally connected at one end to the spindle B and is provided adjacent to its opposite end with a rectangular opening *e*, designed to receive the head *d* of the screw, after the manner shown. The said opening *e* is flanged, as indicated by *f*, in order to give the fastener a broad bearing against the head of the screw. When the fastener D is in the position shown over the head *d* of screw C it will be observed that casual rotation of the screw is precluded, and hence there is no liability of the spindle becoming loose on the axletree. When, however, the fastener is pried up and swung laterally out of engagement with the screw, it will be observed that the screw may be readily turned with a wrench, and when it is removed the spindle may be quickly and easily turned off the end *a* of the axletree.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my invention as claimed.

Having described my invention, what I claim, and desire to secure by Letters Patent, is—

In an axle, the combination of a tree provided with a circular and threaded end, a removable spindle having a threaded socket, in its inner end, snugly receiving said end of the tree, and also having a threaded aperture in the wall of the socket, a screw bearing in said aperture of the spindle, and set against the threaded end of the tree; said screw having an angular head, and a spring-fastener pivoted, at one end, on the spindle, and having an angular aperture, adjacent to its opposite end, receiving the head of the screw, and also having flanges *f* bearing against the sides of said head.

In testimony whereof I have hereunto set my hand in presence of two subscribing witnesses.

JOSEPH H. ENTREKIN.

Witnesses:
J. W. HOLMQUIST,
A. B. PEDEN.